June 24, 1958
W. O. GILES
2,840,012
DOUGHNUT MACHINE CUTTER
Filed May 25, 1956
2 Sheets-Sheet 1
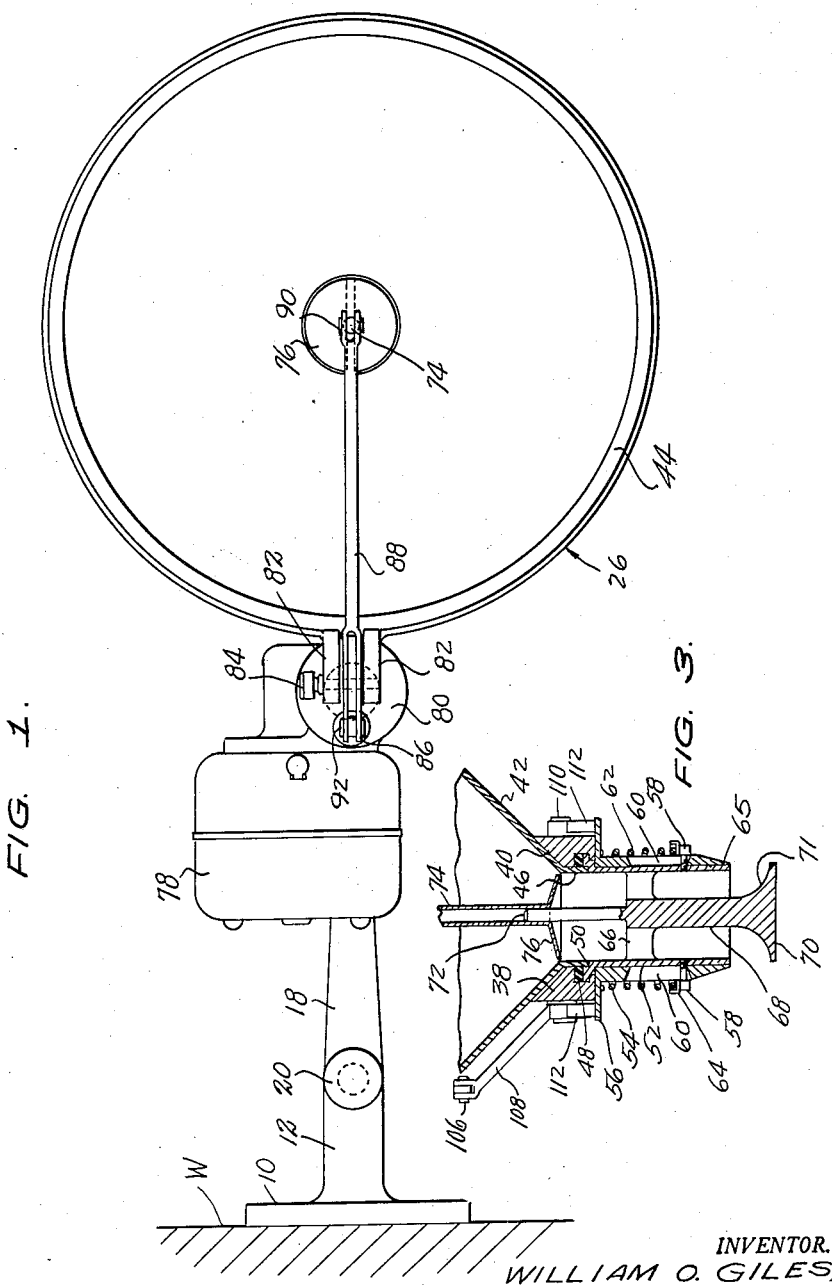
INVENTOR.
WILLIAM O. GILES,
BY
McMorrow, Berman + Davidson
ATTORNEYS.

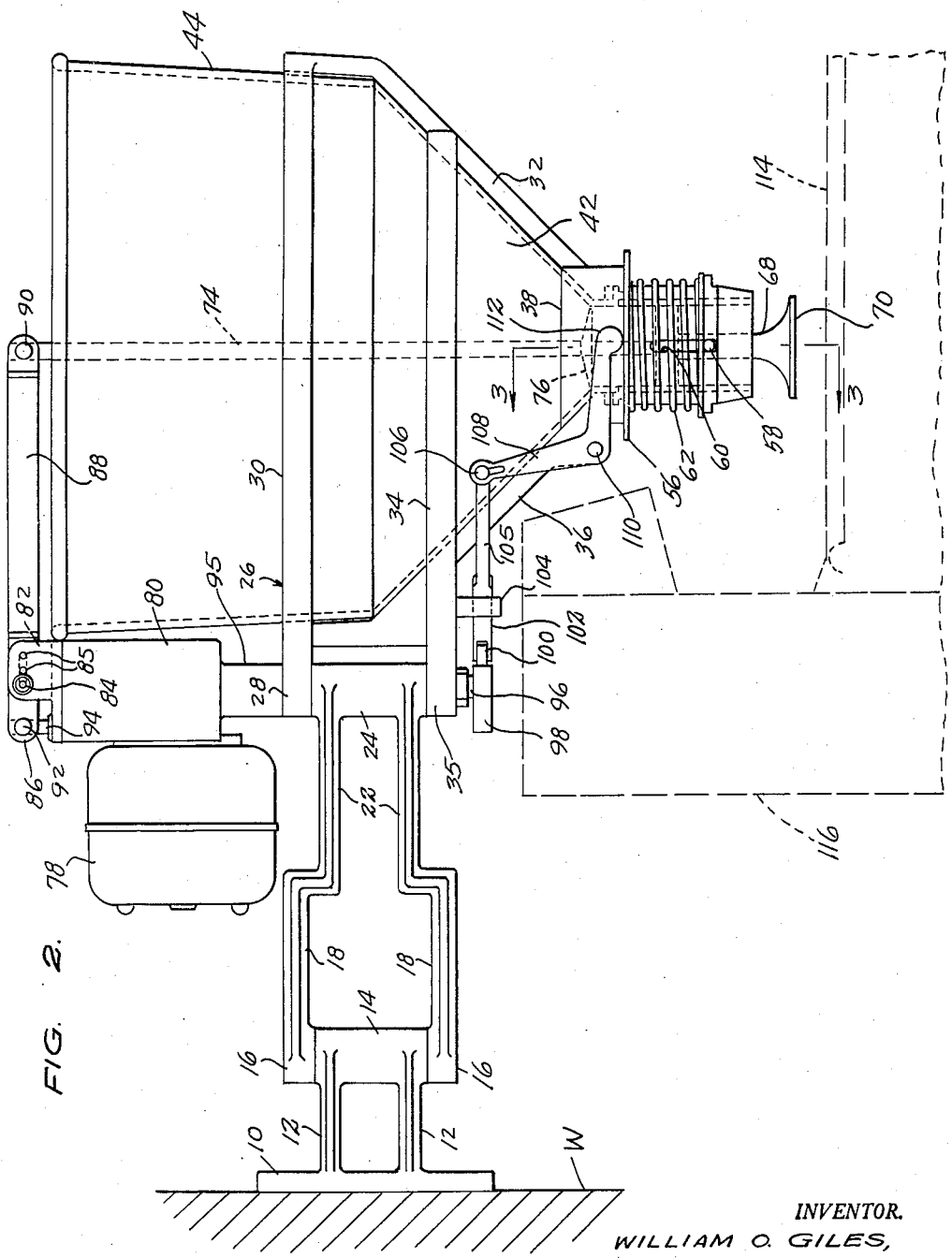

United States Patent Office 2,840,012
Patented June 24, 1958

2,840,012

DOUGHNUT MACHINE CUTTER

William O. Giles, Orlando, Fla.

Application May 25, 1956, Serial No. 587,324

2 Claims. (Cl. 107—14)

This invention relates to devices for the purpose of the quantity production of doughnuts.

One object of importance is to provide a doughnut machine cutter assembly that will be designed particularly to be adaptable both to the smallest doughnut making operation, as well as to use by those engaged in volume production.

Another object is to provide a device of the character described having a particular, novel linkage whereby, on operation of an electric motor, a valve or pusher disc at the bottom of a batter-holding funnel will be continuously reciprocated, to feed into a doughtnut-forming cylinder, at predetermined intervals, batter that is to be formed into an annular shape upon a stationary forming disc. Also driven from the motor is a reciprocating cutter sleeve, which, at predetermined intervals, is shifted downwardly to cut away from the forming disc annular dough shapes that will then gravitate to a fry kettle beneath the device.

One important object is to provide a device of the character referred to so designed as to include a gear box having motion-translating driving connections to rockable elements, one of which elements is adapted to impart axial reciprocation to the stem of the valve or pusher disc while the other of said elements is adapted to impart axial motion, in a path coaxially aligned with said stem, to the movable cutter sleeve.

Another object is to provide a construction for a cutter assembly of the type referred to that will be relatively inexpensively constructed, but will nevertheless be adapted to handle a substantial quantity of batter, in a manner calculated to produce a large number of doughnuts in a predetermined interval, the construction being so designed as to cause the cutting and dropping of a maximum of fifty doughnuts per minute in a preferred, commercial embodiment of the invention.

Another object is to provide a precision type cutter particularly designed to permit ready adjustment of the length of travel of the stem of the valve disc.

Yet another object is to facilitate disassembly of the machine, for cleaning purposes.

Another object is to provide a cutting machine as stated wherein the drive means for the valve stem and cutting sleeve will all be disposed exteriorly of the device, in positions such as to insure to the maximum extent against these components being clogged by batter, flour, etc.

Other objects will appear from the following description, the claims appended thereto, and from the annexed drawing, in which like reference characters designate like parts throughout the several views, and wherein:

Figure 1 is a top plan view of a doughnut machine cutter assembly formed according to the present invention;

Figure 2 is a side elevational view thereof; and

Figure 3 is a detail sectional view on line 3—3 of Figure 2.

Referring to the drawings in detail, designated by the reference letter W is a wall surface or other vertical support, to which is fixedly connected a bracket 10 having vertically spaced, horizontally projecting arms 12 integral at their outer ends with a vertically disposed bearing sleeve 14. Extending through bearing sleeve 14 is a pin on the ends of which are pivotally mounted horizontally swinging, vertically spaced arms 18. The pin has been designated at 20 (Figure 1) and would ordinarily be removable to facilitate disassembly and assembly.

At their outer ends, the arms 18 are formed with inwardly offset extensions 22 integral at their outer ends with a vertically disposed bearing sleeve 24.

A funnel support frame has been generally designated at 26, and includes an upper ring 30, formed with a radial bearing extension 28 having a bearing opening aligned with the bore of sleeve 24. At a location diametrically opposite the bearing extension 28, ring 30 is formed with a downwardly extending arm 32 inclined as shown in Figure 2, and connected intermediate its ends to a smaller ring 34 having a radial bearing extension 35 formed with a bearing opening aligned with the bore of the sleeve 24. The extensions 28, 35 bear against the opposite ends of the sleeve 24.

Rigid with the ring 34 is an inclined bar 36, extending in downwardly converging relation in respect to the bar 32.

At their convergent ends, the bars 32, 36 are integral or otherwise made rigid with a cylindrical sleeve 38 having, as shown in Figure 3, a flared counterbore 40 at its upper end receiving the tapered bottom portion 42 of a dough funnel or container 44 in which the batter that is to be formed into doughnuts is deposited. The machine is designed, in this connection, to handle what is known in the trade as cake doughnut batter, although the principles of the invention do not require restriction of the use of the device to the forming of doughnuts from this particular type of batter.

The tapered lower end portion 42 of the funnel 44 merges into a cylindrical extension 46, surrounded by a rubber gasket 48 seating in a counterbore provided at the lower end of the bore of the sleeve 38. The gasket 48 bears against the outwardly flanged upper end 50 of a cylindrical member 52 arranged as a downwardly projecting prolongation of the extension 46, to cooperate with extension 46 in providing a forming cylinder.

Receiving and vertically slidable upon the cylindrical member 52 is a cutting sleeve 54, formed at its upper end with an outwardly directed, planiform flange 56 normal to the axis of the sleeve. Diametrically opposed screws 58 are threaded into openings formed in the wall of the member 52, and project through longitudinal slots 60 formed in the cutting sleeve 54. A compression coil spring 62 surrounds the sleeve 54, bearing at one end against the flange 56 and at its other end against a ring 64 supported upon the screws 58. The spring 62, tending to expand, normally urges the cutting sleeve upwardly, and in this position the cutting sleeve, a beveled, sharpened lower end 65 thereof is flush with the lower end of the forming cylinder.

Rigid with the wall of the member 52 intermediate opposite ends of said member are angularly spaced, radially disposed arms 66 integral with the upper end of the stem 68 of a forming disc 70 that is spaced downwardly from the lower end of the forming cylinder and has a curvingly sloped top surface 71 adapted to form the batter gravitating within the cylinder into an annular shape, to cause said batter to flow outwardly, fully formed, off the periphery of the forming disc. Rigid with the upper end of the stem 68 is a reduced axial extension 72, extending upwardly into the lower end of a tubular, elongated, vertical stem 74 of a pusher disc, valve, or piston 76, extension 72 thus providing a guide for the stem 74 during axial reciprocation of said stem 74.

An electric motor has been designated at 78, and the shaft thereof extends into a gear box 80. Projecting upwardly from the cover of the gear box are transversely spaced brackets 82 (see Figure 1) having aligned openings adapted to receive a pin 84. The brackets are provided with a series of openings 85 so that the pin 84 can be positioned through a selected pair of transversely aligned openings.

Extending between the brackets 82 is the bifurcated outer end 86 of an elongated lever 88, the inner end of which is bifurcated and apertured to receive a pin 90 that provides a sliding or loose pivotal connection between the lever 88 and the upper end of the stem 74 such that on up-and-down rocking movement of the inner end of the lever, the stem 74 will be correspondingly shifted upwardly and downwardly. In the lowered position of the stem 74, the disc or piston 76 is disposed in the upper end of the dough forming cylinder as shown in Figure 3, thus preventing batter from flowing into the forming cylinder. Each time the stem 74 is elevated, the piston 76 is raised to permit a predetermined amount of dough or batter to enter the forming cylinder for gravitation to the sloped surface of the forming disc 70.

The bifurcated end 86 of lever 88 is provided with transversely aligned openings receiving the pin 84, thus rockably mounting the lever 88 upon the upper end of the gear box 80. At the outer end of the lever, a pin 92 extends therethrough, providing a loose pivotal connection between the lever and the upper end of a lifter rod 94 vertically slidable in the cover of the gear box.

Within the gear box, there is provided a suitable mechanical movement adapted to translate rotary motion of the shaft of motor 78 into vertical reciprocating motion of the lifter rod 94. Such a mechanical movement, per se, is old, and accordingly it is not believed necessary to specifically illustrate one such mechanical movement that could be used. As an instance of one that might be employed, however, there may be attached to one of the rotary shafts within the gear box an eccentric, to the marginal portion of which is pivotally connected one end of a link the other end of which has a pivotal connection to the vertically shiftable rod 94, so that on rotation of the eccentric, the rod 94 would be moved upwardly or downwardly.

Also driven by the motor shaft and extending downwardly through a depending, axial extension 95 of the gear box is a shaft designated at 96, said shaft extending through extension 95, bearing extensions 28, 35 of frame 26, and bearing sleeve 24. Shaft 96 at its lower end is fixedly connected to an eccentric 98 the periphery of which bears against a roller 100 carried by the bifurcated outer end of a bar 102 mounted for horizontal sliding movement in a bracket 104 depending from the frame 26. Bar 102 at its inner end is integrally formed with a U-shaped yoke 105 embracing the tapered lower end portion 42 of the funnel.

The yoke 105, at opposite sides of the funnel, is pivotally connected to identical, transversely aligned bell cranks 108, through the medium of pins 106. The pins 106 extend through slots in the arms of the bell cranks, to provide a sliding or loose pivotal connection such that the upper ends of the bell cranks can travel through arcuate paths with the yoke 105 reciprocating horizontally in a straight path.

The bell cranks are fulcrumed, intermediate their ends, upon a pin 110 carried by the sleeve 38. At their free ends, the bell cranks have depending, rounded enlargements 112 bearing against diametrically opposite portions of the flange 56.

Below the cutter there would be a fry kettle 114 having a deep fat container positioned to receive the formed doughnuts as they drop from the cutter, said fry kettle including at one side an upwardly projecting portion 116.

By reason of the construction illustrated and described, on operation of the motor 78, the eccentric 98 will be rotated, and the lifter rod 94 will be vertically reciprocated, at predetermined intervals. Said intervals, and the speed of movement of the eccentric and lifter rod, are determined, of course, by the particular ratios of the gears within the gear box, according to the desires of the particular manufacturer. In any event, on movement of the lifting rod and eccentric in this manner, the lever 88 will be oscillated about a horizontal axis defined by the pin 84, causing vertical reciprocation of the stem 74 and valve or pusher disc 76.

Further, with the eccentric 98 turning, bar 102 will be shifted horizontally in one direction by the eccentric, rocking bell crank 108 in a clockwise direction about its pivot 110, to shift the cutting sleeve 54 downwardly against the restraint of spring 62. The spring 52, then, is free to expand, to shift sleeve 54 upwardly and, through the medium of the bell crank, hold the roller 100 continuously in engagement with the periphery of the eccentric 98.

It will be understood that with batter being fed into the forming cylinder at timed intervals by raising and lowering of the disc 76, there will be a substantially continuous flow of batter from the sloped top surface 71 of the stationary forming disc 70. The sleeve 54 is timed to shift downwardly past the periphery of the forming disc 70 at intervals sufficient to cleanly cut off the dough that has moved past the periphery and is about to gravitate to the fry kettle. Thus, annular doughnut shapes are cut off by the sleeve, and drop into the deep fat.

It has been found that a device manufactured as illustrated and described herein is adapted to be manufactured at relatively low cost, thus rendering the same suitable for use in small establishments. At the same time, however, the device is equally well adapted for use by those engaged in volume production, such as large bakeries, etc.

It is believed apparent that the invention is not necessarily confined to the specific use or uses thereof described above, since it may be utilized for any purpose to which it may be suited. Nor is the invention to be necessarily limited to the specific construction illustrated and described, said construction only being intended to be illustrative of the principles of operation and the means for carrying out said principles, it being considered that the invention comprehends any minor change in construction that may be permitted within the scope of the appended claims.

What is claimed is:

1. In a doughnut machine cutter assembly, a linkage for shifting a cutter sleeve in a downward direction to a cutting position at periodic intervals, comprising: a bell crank rocking on a horizontal axis and adapted at one end for engaging the cutter sleeve, thus to shift the sleeve downwardly responsive to rocking of the bell crank in one direction; an elongated, horizontally extending bar means having a sliding, pivotal connection at one end to the other end of the bell crank, said bar means being mounted for movement in the direction of its own length in a generally straight path; a gear box having input and output shafts extending therefrom, the input shaft being adapted for connection to a source of driving power; and an eccentric secured to the output shaft for rotation therewith, said eccentric peripherally contacting the other end of the bar means and shifting the bar means to rock the bell crank.

2. In a doughnut machine cutter assembly, a linkage for shifting a cutter sleeve in a downward direction to a cutting position at periodic intervals, comprising: a bell crank rocking on a horizontal axis and adapted at one end for engaging the cutter sleeve, thus to shift the sleeve downwardly responsive to rocking of the bell crank in one direction; an elongated, horizontally extending bar means having a sliding, pivotal connection at one end to the other end of the bell crank, said bar means being mounted for movement in the direction of its own length in a generally straight path; a gear box having input and output shafts extending therefrom, the input shaft being adapted for connection to a source of driving power; an eccentric secured to the output shaft for rotation therewith, said eccentric peripherally contacting the other end of the bar means and shifting the bar means to rock the bell crank; and means adapted for vertically reciprocating the vertically extending stem of a forming piston of said machine, comprising a lifter rod projecting out of the gear box and reciprocating vertically therein in synchronous relation to the rotational movement of the output shaft, and a lever fulcrumed intermediate its ends on the gear box for swinging movement in a vertical plane and pivotally, loosely connected at one end to the lifter rod, said lever at its other end being adapted for loose, pivotal connection to a stem of a forming piston.

References Cited in the file of this patent

UNITED STATES PATENTS

| | | |
|---|---|---|
| 750,609 | Cote | Jan. 26, 1904 |
| 1,776,780 | Carpenter | Sept. 30, 1930 |
| 1,798,582 | Bergner | Mar. 31, 1931 |
| 1,811,564 | Schoel | June 23, 1931 |
| 1,866,061 | Schoel | July 5, 1932 |